(12) United States Patent
Ezzat (10) Patent No.: US 8,024,529 B2
(45) Date of Patent: Sep. 20, 2011

(54) PROVIDING SHARED MEMORY IN A DISTRIBUTED COMPUTING SYSTEM

(75) Inventor: Ahmed K. Ezzat, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 12/473,391

(22) Filed: May 28, 2009

(65) Prior Publication Data
US 2010/0306479 A1   Dec. 2, 2010

(51) Int. Cl.
*G06F 13/00* (2006.01)
(52) U.S. Cl. .................................... 711/148; 711/147
(58) Field of Classification Search .................. 711/147, 711/148
See application file for complete search history.

(56) References Cited

U.S. PATENT DOCUMENTS

| | | | | |
|---|---|---|---|---|
| 5,257,369 | A * | 10/1993 | Skeen et al. | 719/312 |
| 5,968,114 | A * | 10/1999 | Wentka et al. | 718/100 |
| 5,978,839 | A * | 11/1999 | Okuhara et al. | 709/215 |
| 7,613,882 | B1 * | 11/2009 | Akkawi et al. | 711/124 |
| 2004/0083342 | A1 * | 4/2004 | Gschwind et al. | 711/147 |
| 2006/0143360 | A1 * | 6/2006 | Petev et al. | 711/6 |
| 2007/0136433 | A1 * | 6/2007 | Booton et al. | 709/213 |
| 2008/0140633 | A1 * | 6/2008 | Holt | 707/3 |

OTHER PUBLICATIONS

Non-Uniform Memory Access, Wikipedia, http://en.wikipedia.org/wiki/non-uniform_memory_access, (3 pages), Mar. 2009.
MPI: A Message-Passing Interface Standard, Version 2.1, Jun. 23, 2008 (608 pages).
Hideharu Amano, NUMA machines, Textbook (29 pages) (2003).
NYU UltraComputer Project Home Page, URL: http://cs.nyu.edu/cs/projects/ultra/ (dated on or before May 29, 2009) (1 page).
HP 9000 Superdome Server Overview & Features (2008) (1 page).
Matthew Chapman and Gernot Heiser, Implementing Transparent Shared Memory on Clusters Using Virtual Machines, USENIX '05, Apr. 2005, pp. 1-4.
Intel Itanium Architecture Software Developer's Manual, vol. 2: System Architecture, Revision 2.2, Jan. 2006 (654 pages).
K. Li and P. Hudak, Memory Coherence in Shared Virtual Memory Systems, ACM Transactions on Computer Systems, 7(4), Nov. 1989, pp. 321-359.
Cashmere Home Page, Coherence Algorithms for Shared Memory Architectures, Oct. 2006, http://www.cs.rochester.edu/research/cashmere/ (4 pages).
L. Kontothanassis, G. Hunt, R. Stest, N. Hardavellas, M. Cierniak, S. Prthasarathy, W. M. Jr., S. Dwarkadas, and M. L. Scott, "VM-Based Shared Memory on Low-Latency, Remote-Memory-Access Network", Technical Report #643, Nov. 1996 (pp. 1-15).

(Continued)

*Primary Examiner* — Hoai V Ho
*Assistant Examiner* — Jay Radke (57) ABSTRACT

A distributed computing system includes a plurality of processors and shared memory service entities executable on the processors. Each of the shared memory service entities is associated with a local shared memory buffer. A producer is associated with a particular shared memory service entity, and the producer provides data that is stored in the local shared memory buffer associated with the particular shared memory service entity. The shared memory service entities propagate content of the local shared memory buffers into a global shared memory, wherein propagation of content of the local shared memory buffers to the global shared memory is performed using a procedure that relaxes guarantees of consistency between the global shared memory and the local shared memory buffers.

19 Claims, 4 Drawing Sheets

OTHER PUBLICATIONS

L. Iftode, C. Dubnicki, E. W. Felten, and K. Li, "Improving Release-Consistent Shared Virtual Memory Using Automatic Update", Proceedings of the Second International Symposium on High Performance Computer Architecture, Feb. 1996 (12 pages).

S. V. Adve and K. Gharachorloo, "Shared Memory Consistency Models: A Tutorial", WRL Research Report, Sep. 1995, pp. 1-28.

D. J. Scales, K. Gharachorloo, and A. Aggarwal, "Fine-Grain Software Distributed Shared Memory on SMP Clusters", WRL Research Report, Feb. 1997 (pp. 1-28).

R. Noronha and D. K. Panda, "Designing High Performance DSM Systems using InfiniBand Features", Technical Report, Nov. 2003, pp. 1-11.

V. Tipparaju and J. Nieplocha, "Optimizing All-to-All Collective Communication by exploiting Concurrency in Modern Networks", Proceedings of the 2005 ACM/IEEE, 2005 (9 pages).

N. J. Boden, D. Cohen, et al., "Myrinet: A Gigabit-per-second Local Area Network", IEEE Micro, Feb. 1995, pp. 1-15.

Quadrics Ltd."QsNetIII, Quadrics third generation HPC Interconnect", URL: http://www.quadrics.com/ (dated on or before May 29, 2009).

T. Hoefler, A. Lumsdaine, and W. Rehm, "Implementation and Performance Analysis of Non-Blocking Collective Operations for MPI", Supercomputing Nov. 2007, Slides (23 pages).

T. Hoefler and A. Lumsdaine, "Non-Blocking Collective Operations for MPI-3", Jan. 2008 (9 pages).

\* cited by examiner

PROVIDING SHARED MEMORY IN A DISTRIBUTED COMPUTING SYSTEM

BACKGROUND

A distributed computing environment includes a number of computing nodes, where each computing node can include one or more processors on which software modules execute. Data produced by some of the software modules can be retrieved by other software modules in the distributed computing environment.

To improve performance in the distributed computing environment, a shared memory can be implemented, where data produced by software modules can be stored for retrieval by other software modules. However, conventional shared memory architectures have various issues, including relatively high cost and/or inability to scale efficiently as the size of the computing environment is increased.

BRIEF DESCRIPTION OF THE DRAWINGS

Some embodiments of the invention are described with respect to the following figures.

DETAILED DESCRIPTION

A distributed computing environment or system typically includes a number of computing nodes. More generally, a "distributing computing environment" refers to any environment that has multiple processors on which software processes are executable. Examples of software processes include producers and consumers, where producers produce data for consumption by the consumers. To improve performance and simplify programming in a distributed computing environment, a shared memory can be provided as a means of sharing data between producers and consumers. Producers can store data into the shared memory, and consumers can retrieve data from the shared memory. As used here, the term "memory" refers to dynamic RAM (random access memory) or a semiconductor storage device (such as a solid-state SSD device), and/or any other type of storage.

Conventionally, a shared memory architecture can be hardware-based or software-based. One example of a hardware-based shared memory architecture is the Non-Uniform Memory Access (NUMA) architecture, which employs specialized hardware to support a shared memory in the distributed computing environment. Although hardware-based shared memory architectures provide relatively high performance, they tend to be relatively expensive.

Another type of shared memory architecture is a conventional symmetrical multiprocessor shared memory architecture. Although a symmetrical multiprocessor shared memory architecture may be more cost-effective than the hardware-based shared memory architecture discussed above, such an architecture may not scale efficiently as additional entities (e.g. producers and/or consumers) are added to the distributed computing environment.

In accordance with some embodiments, a software-based loosely coupled shared memory architecture is provided that employs shared memory services that cooperate within the distributed computing environment to provide a shared memory. Producers and consumers in the distributed computing environment are able to access (write or read) the shared memory using the such shared memory services. A "shared memory service" is a software entity that is executable on processors in the distributed computing environment. In the ensuing discussion, such entities are referred to as "shared memory service entities."

A collective of the shared memory service entities provides an abstraction of the shared memory to the producers and consumers of the distributed computing environment. A producer or consumer can register with the corresponding local shared memory service entity, which allows the producer or consumer to access the shared memory. A producer provides data to be written to the global shared memory, which a consumer retrieves from the global shared memory. Note that a process can be both a producer and a consumer.

The shared memory service entities are each associated with a local shared memory buffer, which is a region of memory in a computing node on which the corresponding shared memory service entity is provided. The shared memory service entities are defined to be part of a collective such that the content of the local shared memory buffers is propagated to a global shared memory on an intermittent basis. Intermittently propagating content of local shared memory buffers to the global shared memory refers to propagation that can be performed periodically, on-demand, or based on other events.

The propagation of the content of the local shared memory buffers to the global shared memory is performed using a procedure that relaxes guarantees of consistency between the global shared memory and the local shared memory buffers. The synchronization of the content of the local shared memory buffers with the global shared memory is performed on a gradual basis such that at any given point in time, it is possible that data in at least one of the local shared memory buffers may be inconsistent with data in the global shared memory. Thus, consumers of the content of the global shared memory may retrieve data that may be inconsistent with corresponding data that may have been recently updated in one of the local shared memory buffers (such as due to a write operation that has not yet been propagated to the global shared memory). The relaxation of guarantees of consistency allows for a more efficient shared memory architecture that scales more easily and that does not consume large amounts of processing bandwidth of the distributed computing environment. The synchronization of content of local shared memory buffers with the global shared memory can be performed as a background process, such that other software processes in the distributed computing environment have higher priority access of computing resources. By performing the synchronization in the background, consumers will not be blocked until synchronization is completed. This can enhance performance in a distributed environment with a relatively large number of producers and consumers.

Figure 1:
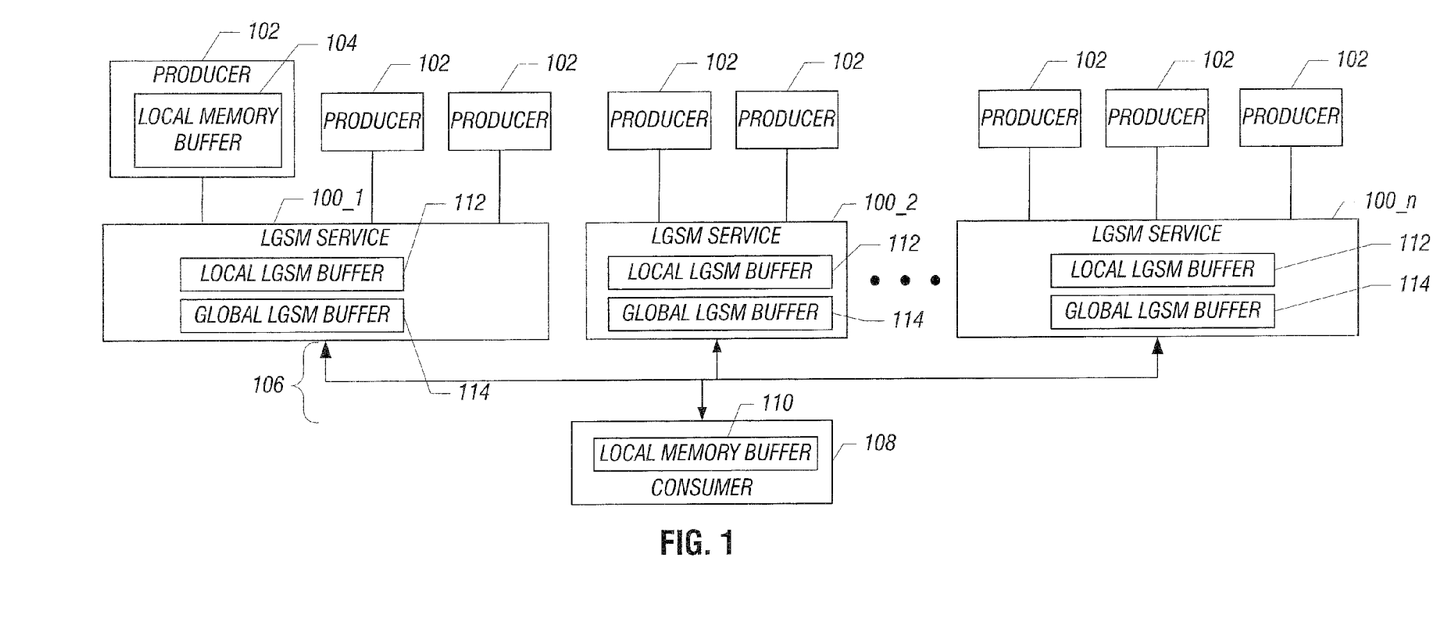
FIG. 1 is a block diagram of an exemplary arrangement that includes shared memory services to provide a shared memory architecture, according to an embodiment.

FIG. 1 illustrates an arrangement that includes multiple shared memory service entities 100_1, 100_2, . . . 100_n, (where n can be greater than or equal to 2). In FIG. 1, the shared memory service entities are referred to as LGSM (logical global shared memory) services. As shown in FIG. 1, each of the LGSM services 100_1, 100_2, . . . 100_n is associated with corresponding sets of producers 102. Each producer 102 has a local memory buffer 104, which is used to collect data produced by the corresponding producer 102. The content of the local memory buffer 104 of each producer 102 is copied to a local shared memory buffer 112 of the corresponding LGSM service (with which the producer 102 has registered).

On an intermittent basis, the content of the local LGSM buffers 112 in the LGSM services 100_1, 100_2, . . . 100_n is propagated to a global LGSM buffer 114 (which is the global shared memory discussed above). In the embodiment of FIG. 1, a copy of the global LGSM buffer 114 is associated with each LGSM service 100_1, 100_2, . . . 100_n. In the implementation of FIG. 1, each LGSM service 100 is associated with a global LGSM buffer 114 that contains an aggregation of all local LGSM buffers 112. The LGSM services 100 are able to communicate with each other over a network 106.

FIG. 1 also shows a consumer 108 that is coupled to the network 106. The consumer 108 has a local memory buffer 110. In response to a read operation submitted by the consumer 108 for data in the global LGSM buffer 114, such data is retrieved from the global LGSM buffer 114 into the local memory buffer 110. Although not shown in FIG. 1, the consumer 108 is also associated with an LGSM service, which can be one of the LGSM services 100_1, 100_2, . . . 100_n, or with another LGSM service (not shown in FIG. 1).

In one embodiment, the LGSM services 100_1, 100_2, . . . 100_n can employ collective operations associated with the Message Passing Interface (MPI), which is a specification for an application programming interface (API) that allows the LGSM services to communicate with each other. In such implementation, the collective of the LGSM services 100_1, 100_2, . . . 100_n is an MPI collective, which is a set of replicated MPI processes that are synchronized by the MPI infrastructure such that their respective memories are consistent. In one example, MPI collective operations that can be used include MPI_Gather or MPI_Allgather operations. The MPI_Gather operation is used to gather data associated with a group of software processes, while MPI_Allgather operation is used to gather data associated with all software processes. More generally, a "gather" operation refers to a pull-type operation in which consumers pull data from producers through the global shared memory.

Alternatively, if the producers and consumers are implemented with the same (common) executable code image, then MPI_Scatter operation can be used, which scatters the data from the producer's memory to the set of relevant consumers' memories in one step (as discussed with respect to FIG. 6 below). Producers and consumers being implemented with the same executable code image means that the producers and consumers are created using the same software code. The specification that MPI_Scatter can only be used with producers and consumers that execute the same executable code image is provided by the MPI specifications—note, however, that other RDMA IPC paradigms can provide the equivalent of MPI_Scatter to be used even if producers and consumers do not execute the same executable code image. During execution, whether such software code behaves as a producer or a consumer is based on a configurable setting that causes different parts of the software code to be executed (where one part performs tasks of a producer while another part performs tasks of a consumer). A scatter operation, such as an MPI_Scatter operation, causes data from a producer to be propagated (scattered) to a set of consumers (note that different portions of the data from the producer can be sent to different consumers in the set).

If the producers and consumers are implemented with different executable code images, then the MPI_Scatter operation cannot be used; instead, the MPI_Gather operation discussed above can be used.

In one specific implementation, the link 106 between the LGSM services 100_1, 100_2, . . . 100_n is MPI over Infiniband (which is a switched fabric communications link). In other implementations, the link 106 can be any RDMA (Remote Direct Memory Access)-based link. RDMA allows data on one computing node to move to another computing node without involving the operating systems of the computing nodes. Thus, synchronization of data between the LGSM buffers 112 and the global LGSM buffer 114 can be performed at a low level, on a gradual basis, that does not consume too much processing resource in computing nodes of the distributed computing environment.

Once a producer 102 or consumer 108 registers with its respective LGSM service, a unique name (e.g., handle) of the LGSM service is returned to the producer or consumer. In subsequent operations, the producer and consumer will refer to the LGSM service by the unique name.

Each producer 102 and consumer 108 writes to and reads from, respectively, its respective local memory buffer (104 or 110) once the producer and consumer have linked the local memory buffer to the LGSM service. Each producer 102 writes its individual data to its local memory buffer 104, which is provided to the LGSM service, while each consumer 108 is able to read the aggregation of all of the producers' data through the global LGSM buffer 114.

In some embodiments, data produced by the producers 102 and stored in their local memory buffers 104 can be propagated to the corresponding LGSM service every predefined fixed time interval. Consumers 108 can be updated periodically or on demand. The propagation of data between a producer or consumer and an LGSM service can also employ MPI operations.

Figure 2:
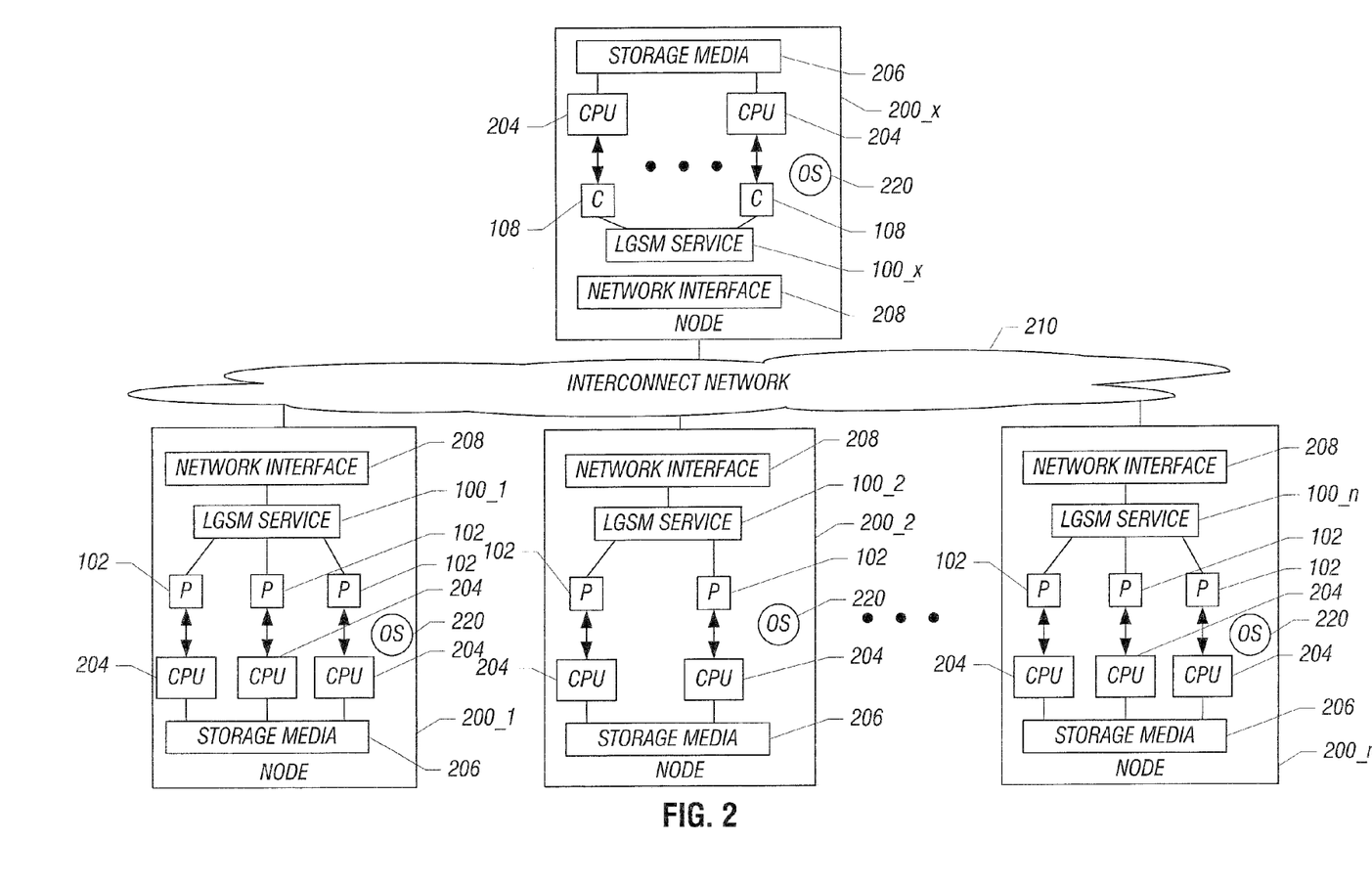
FIG. 2 is a block diagram of an exemplary system that includes a number of computing nodes interconnected by a network, in which a shared memory arrangement according to an embodiment can be implemented.

FIG. 2 is a block diagram of an exemplary distributed computing environment that includes a number of computing nodes 200_1, 200_2, . . . 200_n. As shown in FIG. 2, each computing node has multiple CPUs (central processing units) 204. In some other implementations, one or more of the computing nodes can include just one CPU.

Each of the nodes 200_1, 200_2, . . . 200_n includes producers 102 that are executable on corresponding CPUs 204. Although FIG. 2 shows one producer executable on one CPU, it is noted that there can be multiple producers executable on a CPU.

The CPUs 204 are connected to storage media 206 in the corresponding computing node. In addition, each of the computing nodes 200_1, 200_2, . . . 200_n includes a corresponding LGSM service 100_1, 100_2, . . . 100_n. In the example of FIG. 2, there is one LGSM service per computing node. In a different implementation, some of the computing nodes can be implemented without an LGSM service.

Each computing node 200_1, 200_2, . . . 200_n also includes a network interface 208 to allow the computing node to communicate over an interconnect network 210, such as a local area network (LAN), a wide area network (WAN), the Internet, and so forth.

Another computing node 200_x is also connected to the interconnect network 210. The computing node 200_x includes consumers 108 executable on corresponding CPUs 204, which are connected to storage media 204. The computing node 200_x also includes an LGSM service 100_x to which the consumers 108 are registered. The computing node 200_x includes a network interface 208 to communicate over the interconnect network 210.

In one exemplary application of the distributed environment shown in FIGS. 1 and 2, the producers 102 can be statistics collectors that collect statistics regarding the computing nodes 200_1, 200_2, . . . 200_n or statistics about data stored in such computing nodes. The statistics provided by such producers 102 are propagated to the global LGSM buffer 114 through the local memory buffers 104 of the producers and the local LGSM buffers 112 (FIG. 1). The local memory buffers 104, local LGSM buffer 112, and global LGSM buffer 114 can be stored in the storage media 206 of the computing nodes.

In this exemplary application, the consumers 108 can be workload managers that decide how workloads in the distributing computing environment are to be assigned to corresponding computing nodes. The workloads can be workloads associated with database queries or other types of workloads. The workload managers can decide whether or not to allow an incoming workload to be executed immediately, or to queue the incoming workload for later execution, which can be decided based on the priority of the incoming workload and the current resource utilization of the distributed computing environment. To make the decisions regarding assignment of incoming workloads, the workload managers (consumers 108) has to be able to access statistics provided by the statistics collectors (producers 102) using the global LGSM buffer 114.

As shown in FIGS. 1 and 2, the number of network connections between consumers and producers is relatively small. For each producer, there is one connection to the corresponding local LGSM service entity. Similarly, for each consumer, there is one connection between the consumer and the LGSM service. Thus, given M producers and N consumers, there will be M+N connections. In contrast, using traditional point-to-point IPC (inter-process communication) will involve M×N IPC connections between producers and consumers to allow for proper data sharing between producers and consumers, which increases complexity of the IPC connections management (i.e., setting up and releasing these connections), and reduces the ability to scale efficiently as new producers and/or consumers are added.

Figure 3:
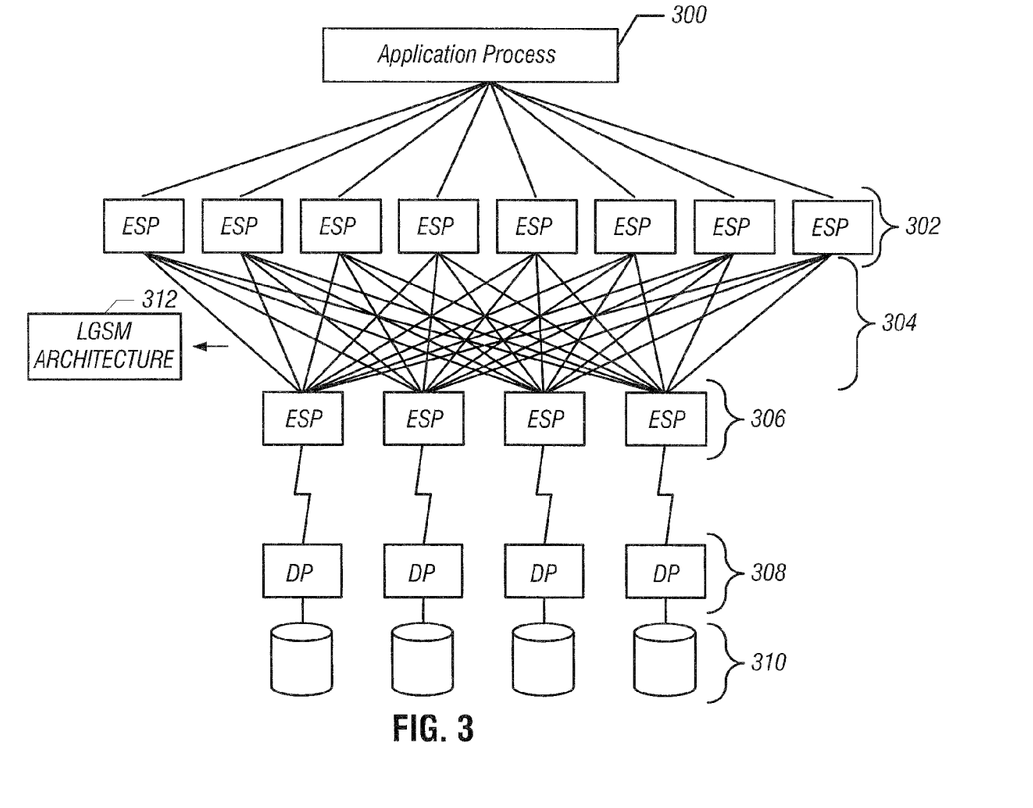
FIG. 3 is a block diagram of an exemplary arrangement that includes processing entities for performing database operations, to which the shared memory architecture according to an embodiment can be applied.

FIG. 3 shows another exemplary application of the shared memory architecture according to an embodiment. FIG. 3 shows storage devices 310 and disk processes (DP) 308 that provide access of content of the corresponding storage devices 310. In addition, two layers of executor server processes (ESPs) 302 and 306 are provided, where each executor server process 302 or 306 is to perform a corresponding operation. In one example, the arrangement shown in FIG. 3 is a database arrangement, where the entities shown in FIG. 3 are used to perform database operations, such as join operations or group-by operations based on data in tables stored in the storage devices 310.

The disk processes 308 retrieve data from the storage devices 310 and provide the data to the first layer of executor server processes 306. The first layer of executor server processes 306 then provides a first set of database operators. The results provided by the first layer of executor server processes 306 are then provided to the second layer of executor server processes 302 through connections 304. FIG. 3 also shows an application process 300 that can request transactions to be performed by the executor server processes 302, 306, and the disk processes 308. For example, the application process 300 can be a database management application.

In the example in FIG. 3, the second layer of executor server processes 302 can be considered to be consumers, while the first layer 306 of executor server processes can be considered to be producers. Conventionally, assuming that there are N executor server processes in the layer 306, and M executor server processes in the layer 302, M×N connections 304 between the executor server processes 302 and 306 would have to be provided. However, according to an embodiment, the M×N connections 304 can be replaced with an LGSM architecture 312 similar to that shown in FIGS. 1 and 2 and would employ only (M+N) IPC connections.

Figure 4:
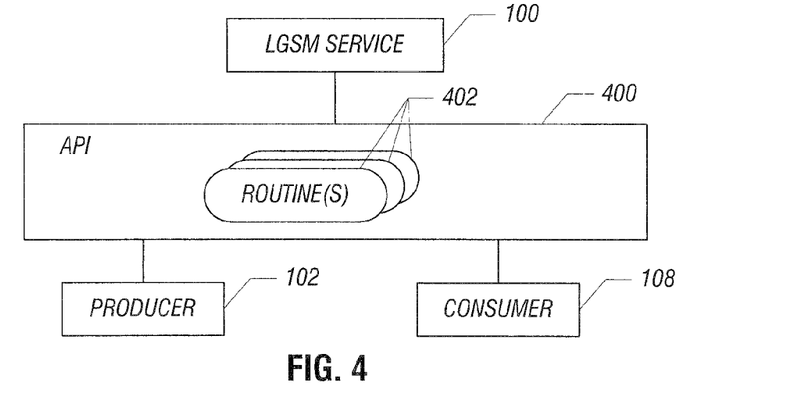
FIG. 4 is a block diagram of an arrangement that depicts an application programming interface (API) provided between a shared memory service and a producer and consumer, according to an embodiment.

FIG. 4 shows an application programming interface (API) 400 defined between an LGSM service 100 and a producer 102 and/or a consumer 108. The API 400 includes various API routines 402 that can be invoked by a producer 102 or a consumer 108 to perform a requested action with respect to the LGSM service 100.

Examples of API routines 402 and the API 400 that can be invoked by the producer 102 include the following. An LGSM_open( ) routine can be invoked by the producer 102 to establish a connection (e.g., an MPI connection) with the LGSM service 100. An LGSM_add( ) routine can be invoked to register the producer 102 with the LGSM service 100. An LGSM_put( ) routine can be called by the producer 102 to copy the local memory buffer 104 (FIG. 1) of the producer 102 to the local LGSM buffer 112 (FIG. 1). An LGSM_drop ( ) routine can be called by the producer 102 to un-register the producer from the LGSM service. An LGSM_close( ) routine can be used to close the connection with the LGSM service.

The consumer 108 can also call the LGSM_open( ) routine to establish a connection with the LGSM service 100. Moreover, the consumer 108 can call an LGSM_IOCTL( ) routine to refresh or set a local context. The local context can be set by the consumer 108 to identify a subset of the producers 102 from which the consumer is interested in obtaining data. Such a subset can be identified in the context. Refreshing the local context will allow added or dropped producers of the subset to be identified.

An LGSM_get( ) routine is called by the consumer 108 to retrieve data from the global LGSM buffer 114. The LGSM_close( ) routine can be called by the consumer 108 to close a connection with the LGSM service.

Although specific API routines that have been identified above, it is noted that such routines are provided for purposes of example only. In other implementations, other or additional API routines can be used.

Figure 5:
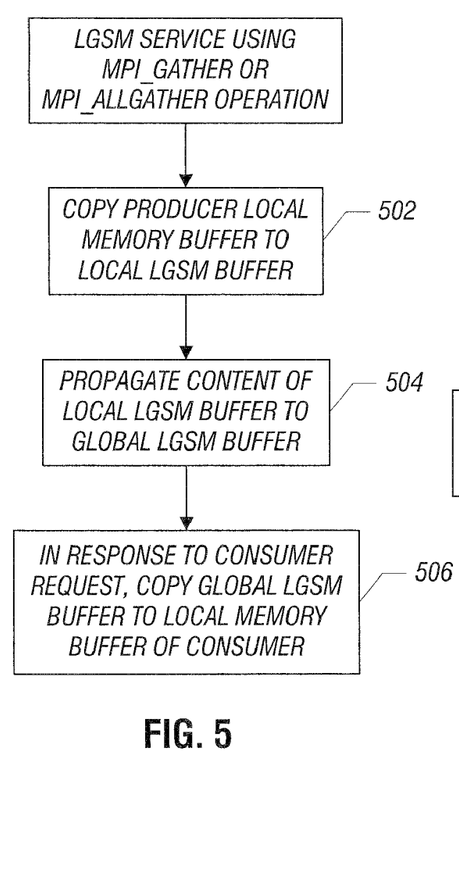
FIG. 5 is a flow diagram of a process performed by the shared memory service when producers and consumers are running different executable code, according to an embodiment.

FIG. 5 shows tasks performed by an LGSM service 100, according to an embodiment. The FIG. 5 process is performed in an arrangement where the producers 102 and consumers 108 are implemented with different executable code images. On a periodic basis, for example, the LGSM service copies (at 502) data in the local memory buffer 104 (FIG. 1) of the producer 102 to the local LGSM buffer 112 (FIG. 1) of the LGSM service. In one example implementation, copying of data from the producer's local memory buffer 104 to the local LGSM buffer 112 can be performed using an MPI_Alloc operation. In other implementations, other types of operations can be employed.

Another task performed by the LGSM service 100 is the propagation (at 504) of the content of its local LGSM buffer 112 to the global LGSM buffer 114. This can be performed on a periodic basis, such as by using an MPI operation (e.g., MPI_Gather, MPI_Allgather). The propagation of content of local LGSM buffers 112 to the global LGSM buffer 114 can be performed once every predefined time interval, where the time interval is configurable to different values. By using MPI operations, the synchronization of data between the local LGSM buffers 112 and the global LGSM buffer 114 is performed at a low level using RDMA operations that involve controllers (such as controllers of the network interfaces 208 of the computing nodes in FIG. 2). The actual transfer of data between the local LGSM buffers 112 and the global LGSM buffer 114 does not involve the operating systems 220 of the computing nodes, which reduce consumption of processing resources during the synchronization process.

In response to requests from a consumer 108 (or periodically), the LGSM service 100 can copy (at 506) data from the global LGSM buffer 114 to the local memory buffer 110 (FIG. 1) of the consumer 108. For example, this can be in response to the MPI_Get( ) routine invoked by the consumer 108.

In another embodiment, if the producers 102 and consumers 108 of the distributed computing environment are implemented with the same executable code image, then an MPI_Scatter operation can be employed to propagate data of a producer to a set of consumers (where the set of consumers can be all consumers in the distributed computing environment or some subset of consumers who have indicated an interest in data output by the producer).

Figure 6:
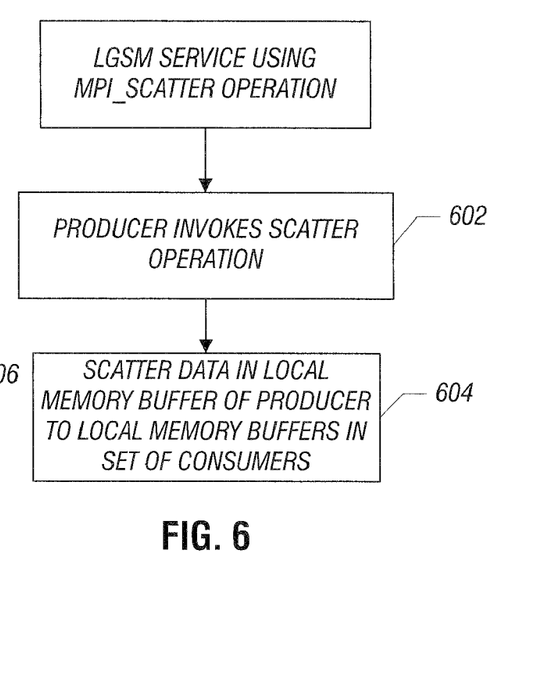
FIG. 6 is a flow diagram of a process performed by the shared memory service when producers and consumers are based on the same executable code image, according to another embodiment.

As shown in FIG. 6, a producer 102 invokes (at 602) a scatter operation, such as an MPI_Scatter operation. The invoked scatter operation causes data in the local memory buffer 104 of the producer 102 to be scattered (at 604) to the set of consumers 108. Scattering of the data of the producer 102 is performed by propagating the data through connections provided between the producer 102/consumers 108 and the LGSM services, as discussed above. Note that even with the scatter operation, there can be the possibility of a consumer reading un-synchronized data since the propagation of the data of the producer between the local shared memory buffers 112 of the LGSM services 100 is performed as a background process to the global shared memory.

By employing the shared memory paradigm according to some embodiments, a more efficient communication or sharing paradigm is provided in a distributed computing environment. The LGSM services of the shared memory paradigm provides an abstraction that effectively decouples producers from consumers, which allows for easier scaling as producers and consumers are added or dropped.

The LGSM shared memory paradigm according to some embodiments allows data to be exchanged without using global semaphores or mutexes (which are mechanisms for preventing concurrent access of a common resource). In some embodiments, local serialization can be enforced by using local synchronization features provided by MPI. Thus, the local LGSM buffer can be accessed by producers and the LGSM service without employing a global semaphore or mutex. Similarly, the global LGSM buffer can be accessed by a collective operation and by a consumer without employing a global semaphore or mutex. As a result, a consumer can efficiently retrieve data from the local copy of the global LGSM buffer into the local memory buffer of the consumer.

Also, since there is a local connection between each producer or consumer and the respective LGSM service, the LGSM service can detect failure of the producer or consumer and can easily perform cleanup operations should a producer or consumer fail. When the failed producer or consumer later comes back up, the producer or consumer can simply perform another registration operation.

Instructions of software described above (including the producers 102, consumers 108, and LGSM services 100 of FIG. 1) are loaded for execution on a processor (such as one or more CPUs 204 in FIG. 2). The processor includes microprocessors, microcontrollers, processor modules or subsystems (including one or more microprocessors or microcontrollers), or other control or computing devices. As used here, a "processor" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A distributed computing system, comprising:
   a plurality of processors;
   shared memory service entities executable on the processors in the distributed computing environment, wherein each of the shared memory service entities is associated with a local shared memory buffer;
   a producer executable on at least one of the plurality of processors, the producer being associated with a particular shared memory service entity, and the producer to provide data,
   wherein the local shared memory buffer associated with the particular shared memory service entity is to store the data provided by the producer,
   wherein the shared memory service entities are executable to propagate content of the local shared memory buffers into a global shared memory, wherein propagation of content of the local shared memory buffers to the global shared memory is performed using a procedure that relaxes guarantees of consistency between the global shared memory and the local shared memory buffers.

2. The system of claim 1, wherein propagation of content of the local shared memory buffers to the global shared memory is performed as a background process.

3. The system of claim 1, further comprising a consumer executable on at least one of the plurality of processors to retrieve data from the global shared memory.

4. The system of claim 3, wherein the producer and consumer employ different executable code images, the shared memory service entities to use RDMA (Remote Direct Memory Access) to propagate data between a memory of the producer and the particular shared memory service entity, and to use RDMA to propagate data between a memory of the consumer an a corresponding shared memory service entity.

5. The system of claim 1, wherein the producer and consumer employ a common executable code image, the shared memory service entities to use RDMA (Remote Direct Memory Access) to scatter data between a memory of the producer and memories of a set of consumers.

6. The system of claim 1, wherein the producer is to register with the shared memory service entity, and wherein registration of the producer with the particular shared memory service entity allows content of a local memory buffer of the producer to be propagated to the local shared memory buffer of the particular shared memory service entity.

7. The system of claim 1, wherein the shared memory service entities are part of an MPI (Message-Passing Interface) collective, and wherein propagation of content of the local shared memory buffers to the global shared memory uses MPI operations.

8. The system of claim 7, further comprising a consumer that employs a common executable code image as the producer, wherein data of the producer is to be propagated to the consumer using an MPI_Scatter operation.

9. The system of claim 7, further comprising a consumer that employs a different executable code image than the producer, wherein data of the producer is to be propagated through the particular shared memory service entity to the consumer using one of an MPI_Gather or MPI_Allgather operation.

10. The system of claim 1, further comprising an application programming interface (API) between the producer and the particular shared memory service entity, wherein the API provides API routines invocable by the producer to communicate with the particular shared memory service.

11. The system of claim 10, further comprising a second producer associated with a second shared memory service entity, wherein the second producer is to invoke the API routines of the API to communicate with the second shared memory service entity.

12. A method of providing a shared memory architecture in a distributed computing environment, comprising:
   providing an abstraction of a shared memory to producers and consumers in the distributed computing environment, wherein the abstraction includes shared memory service entities that execute on processors of the distributed computing environment;
   associating a local memory with each of the shared memory service entities, wherein each local memory is to store data provided by the corresponding producers associated with a corresponding shared memory service entity; and
   synchronizing content of the local memories with a global shared memory as a background process.

13. The method of claim 12, wherein the distributed computing environment includes a plurality of nodes that contain corresponding groups of one or more processors, the method further comprising:
   providing, in each of the plurality of nodes, a corresponding shared memory service entity.

14. The method of claim 12, wherein the synchronizing uses RDMA (Remote Direct Memory Access) operations to propagate data between consumers and producers through the local memories of the shared memory service entities and the global shared memory.

15. The method of claim 14, wherein the producers and consumers employ different executable code images, wherein propagating the data between the consumers and producers employs a gather operation.

16. The method of claim 14, wherein the producer and consumer employ a common executable code image, wherein propagating the data between the consumers and producers employs a scatter operation.

17. The method of claim 12, wherein the shared memory service entities are part of an MPI (Message-Passing Interface) collective, and wherein the synchronizing uses MPI operations.

18. An article comprising at least one computer-readable storage medium containing instructions that upon execution by a computing node of a distributed computing environment cause the computing node to:
   associate a local shared memory buffer with a shared memory service entity executing in the computing node;
   execute a producer that outputs data;
   propagate the data from the producer into the local shared memory buffer; and synchronize content of the local shared memory buffer with a global shared memory that also is synchronized with content of at least one other local shared memory buffer associated with at least one other shared memory service entity on another computing node, wherein the synchronizing employs a procedure that relaxes guarantees of consistency between the global shared memory and the local shared memory buffers.

19. The article of claim 18, wherein the shared memory service entities are part of an MPI (Message-Passing Interface) collective, and wherein the synchronizing uses MPI operations.

* * * * *

UNITED STATES PATENT AND TRADEMARK OFFICE
CERTIFICATE OF CORRECTION

| | | |
|---|---|---|
| PATENT NO. | : 8,024,529 B2 | Page 1 of 1 |
| APPLICATION NO. | : 12/473391 | |
| DATED | : September 20, 2011 | |
| INVENTOR(S) | : Ahmed K. Ezzat | |

It is certified that error appears in the above-identified patent and that said Letters Patent is hereby corrected as shown below:

In column 9, line 10, in Claim 4, delete "an" and insert -- and --, therefor.

Signed and Sealed this
Sixth Day of March, 2012

David J. Kappos
*Director of the United States Patent and Trademark Office*